C. A. ELLSWORTH.
FLASH LIGHT AND CAMERA SHUTTER SYNCHRONIZER.
APPLICATION FILED NOV. 5, 1915.
1,220,325.
Patented Mar. 27, 1917.
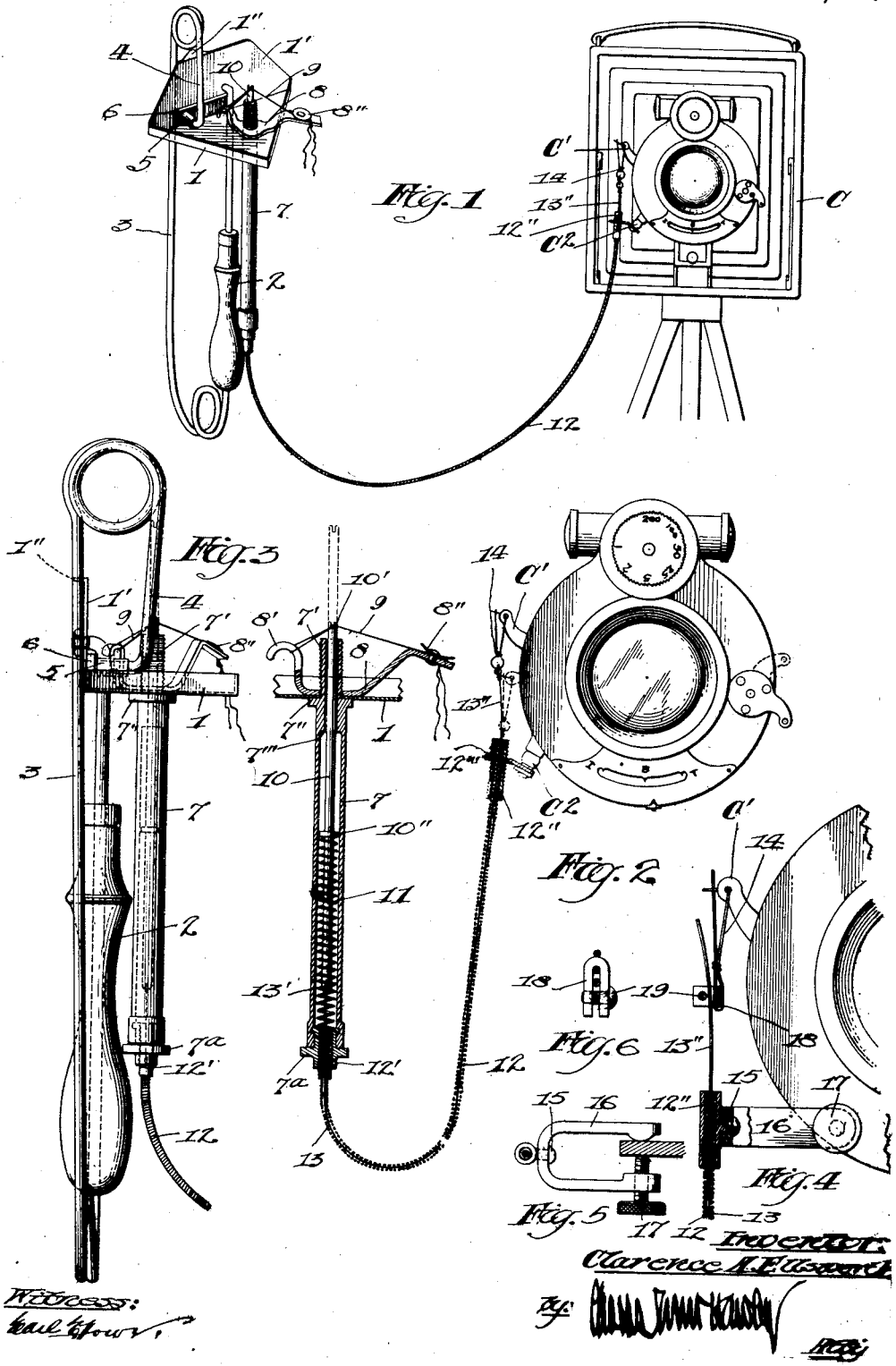

UNITED STATES PATENT OFFICE.

CLARENCE A. ELLSWORTH, OF DENVER, COLORADO, ASSIGNOR OF ONE-HALF TO HARRY C. RUBINCAM, OF DENVER, COLORADO.

FLASH-LIGHT AND CAMERA-SHUTTER SYNCHRONIZER.

1,220,325. Specification of Letters Patent. Patented Mar. 27, 1917.

Application filed November 5, 1915. Serial No. 59,813.

*To all whom it may concern:*

Be it known that I, CLARENCE A. ELLSWORTH, a citizen of the United States, residing at Denver, in the county of Denver and State of Colorado, have invented certain new and useful Improvements in and for Flash-Light and Camera-Shutter Synchronizers, of which the following is a specification.

My invention relates to improvements in flash light apparatus for use with photographic cameras. The object of the invention is to provide mechanical means for releasing or operating the shutter of the camera simultaneously with the flash of light. My purpose more particularly is to provide a simple and inexpensive mechanism by the use of which a photographer, after adjusting his camera and charging his flash light apparatus, may ignite the powder and depend upon the mechanism to open the shutter of the camera at the instant of the flash.

It is well known that although to the naked eye the complete combustion of flash light powder occurs at the instant of its ignition, the combustion of the powder affords at first comparatively little illumination. Hence, to obtain the best results the photographer must delay the opening of the camera shutter until the combustion of the powder reaches the point of maximum illumination. Obviously this is difficult to accomplish with certainty;—and, a special object of my invention is to provide means whereby the opening of the camera shutter shall be positively delayed until the moment of maximum illumination and by which the opening of the shutter may be accomplished at that particular instant.

Heretofore, electric, mechanical, pneumatic, and explosion devices have been proposed for that purpose. I have not found such devices to be either certain or reliable in action and in contrast therewith I employ the heat of the combustion of the flash light powder as the agent or intermediary for the release or operation of the camera shutter. Proceeding upon this principle, my invention viewed as a mechanical device, consists, generally, in a self-acting element arranged to be coupled with a camera shutter, or the like, and normally restrained by another element situated in the region of the combustion or heat of the flash light powder, or other illuminant, and adapted to be destroyed, removed or displaced by the heat therefrom and to thus release the self-acting or shutter-opening element.

In the preferred construction, both the self acting element and the combustible or displaceable restraining element are mounted in or upon the flash powder pan, tray or receptacle, and there is a flexible coupling for the convenient connection of the self-acting element with the release lever of a camera shutter. The restraining element may be a thread of combustible material, such as paper, cotton, linen or celluloid, or may be made of fusible metal or wax or wood of sorts to be sufficiently affected by the heat of the illuminant. Whatever the nature of the destructible or displaceable releasing element, it is always strong enough to hold the shutter mechanism against operation and yet adapted to be weakened, destroyed, or displaced by the heat; to release the shutter mechanism at the instant of maximum illumination from the flash powder or other illuminant. As explained hereinafter, I prefer to adapt my invention for ready application or attachment to any flash light pan, tray, or receptacle without regard to the form thereof or the means employed to ignite the flash powder.

My invention will be readily understood by reference to the drawings that form part of this specification and in which Figure 1 is a perspective view of a flash light device equipped with a synchronizer embodying my invention, shown coupled to the release lever of a camera shutter;—Fig. 2 is a longitudinal sectional view of the synchronizer and the flexible cable connection whereby the same is joined to the release lever of the camera shutter;—Fig. 3 is an elevation of the flash light pan, the igniter, and the synchronizer as they appear in usual commercial form;—and Figs. 4, 5, and 6 show the preferred form of the camera connection.

Referring to the drawings, 1 represents a flash-light powder receptacle, pan or tray. This pan may be of any desired form or shape adapted to contain the required quantity of powder. For use with a mechanical igniter, the pan is preferably equipped with an upstanding wall, 1', having a V-shaped flange, 1'', projecting from its upper edge. The pan, 1, is fixed on the end of a handle, 2, by which it may be safely held. To the handle is fixed the spring bar, 3, of a mechanical igniter. The upper end of the spring bar is looped back upon itself to provide the opposed leg, 4. The lower end of the leg, 4, carries a mechanical sparking element, 5, to work against the complementary file or sparking element, 6, at the bottom of the pan, 1. By grasping the handle, 2, and spring bar, 3, and pressing upon the spring bar, the element, 5, is caused to sweep across the file, 6, and emit sparks, in well-known manner. The action is aided by the cam, 1", wherewith the spring bar engages. The heat of the sparks is sufficient to ignite flash light powder placed in the pan, 1. The device, as thus far described, is of ordinary construction, and my invention is neither limited to nor directly concerned with the details of these portions of the apparatus. This is also true of several parts of the camera, C, though, as hereinafter explained, my invention is concerned and combined with the release lever, C', of the camera shutter, and a part of my device is attached to the camera lens case.

It is customary for the photographer to fill the pan, 1, with flash light powder and then holding the device in one hand to ignite the powder (by operating an igniter) and with the other hand release the shutter of the camera, using the best judgment and highest skill to time the instant of exposure with the illumination from the flash light apparatus. My invention relieves the photographer in this regard and makes it unnecessary for him to either mentally determine or manually gage the instant of shutter operation with respect to the flash.

The preferred form of my invention is extremely simple. In order that the device may be applied to practically any flash powder pan I use as its chief structural element a tubular frame or barrel, 7, having a reduced upper end, 7', and a shoulder, 7". The upper end, 7', is threaded, as shown, and receives a threaded cross bar, 8. The end, 7', is inserted through a hole in the bottom of the pan, 1, and the barrel is made rigid with the pan by turning the bar, 8, upon the thread and thus binding the bottom of the pan between the parts, 8, and 7". The cross bar, 8, serves another purpose;— namely, it constitutes the holder for the combustion restraining element before referred to. Because it is the least expensive and most available, I prefer to use linen, cotton, or paper thread for the restraining element, 9. And to hold the thread I provide the cross bar, 8, with a hooked end, 8', and an opposed cleat or spring button, 8". The hook, 8', and the cleat, 8", are diametrically opposite and therefore the thread, 9, may be stretched across the center of the barrel, 7. The self-acting element in this case comprises a spring plunger, 10, having a notch, 10', in its upper end. The plunger works freely through the upper end of the barrel, 7, and is constantly pressed upward therein by a compression spring, 11, arranged between the bottom of the barrel, and a shoulder, 10", on the plunger, 10. By stretching a thread, 9, between the ends of the cross bar, 8, and in the notch, 10', of the plunger, the plunger may be held in the depressed or retracted position, best shown in Fig. 2. Upon the breaking of the thread, the plunger is forced upward by its spring, 11. The stroke of the plunger is limited by the engagement of the collar, 10", with the under inner shoulder or end, 7''' of the barrel.

The restraining element or thread, 9, being thus positioned in the pan, is in the region of the combustion of the flash light powder therein. While the thread is strong enough to resist the spring, 11, it resists the heat of the burning powder for only an instant following the ignition of the latter. The lapse of time between the initiation of combustion and the release of the spring plunger by the burning or breaking of the thread, 9, may be governed by the kind and size of thread employed. In practice I use thread which thus releases the plunger at the instant of the greatest illumination by the burning flashlight powder. Having determined the kind and size of thread to be used with a charge of flashlight powder, I then determine or adjust the pressure of the spring, 11, so that it shall not be so great as to prematurely break the thread, 9. For all practical purposes a single determination and adjustment of spring and thread is sufficient, as indicated in the drawings; but where a single synchronizing or heating device is to be used with flash pans of several sizes spring adjusting devices of various well known kinds may be added.

The coupling between the self-acting element, 10, and the release lever, C', of the camera may be of any suitable construction. I prefer a coupling of the form best shown in Fig. 2; the same comprising a hollow flexible shaft or cable, 12, having its ends secured in ferrules, 12' and 12". The ferrule, 12', is fastened in the bayonet jointed end, 7ª, of the barrel, 7. The bayonet joint connection allows the cable, 12, to be connected with the barrel, 7, without twisting the cable. It is for this reason that the special connection is used. The ferrule, 12", at the other end of the cable may carry an arm 12''' by which it may be attached to a lug, C², on the lens casing of the camera. Within the hollow cable, 12, is a wire, 13, one end of which is connected to the lower end of the plunger, 10, at point, 13'. This wire is considerably longer than the cable. Its free end, 13", projects from the cable and is equipped with a small loop, or clip, 14, by which it may be joined to the release lever, C', of the camera shutter.

I prefer that the connection of the flexible coupling with the camera shall be of the form shown in detail in Figs. 4, 5, and 6. The ferrule, 12'', at the free end of the flexible cable is swiveled, as by a pin, 15, upon the end of a small yoke, 16, containing a clamping screw, 17. By these means the ferrule may be clamped upon any convenient part of the camera or camera shutter casing. The hook or loop, 14, is not attached directly to the end of the pull-wire, 13'', but instead is secured to a small clip, 18, having a clamping screw, 19. By these means the loop may be adjusted upon the end, 13'', of the coupling-wire, as required, to properly fix the relation of the ferrule, 12'', and the loop, 14. Thus the device is adapted for use with cameras having variously positioned shutter release levers, C', and of various sizes.

The parts being in the position shown in Fig. 2, it will be clear that the synchronizer is in readiness for action. When the thread, 9, is burned away or weakened by the heat of the flash in the pan, 1, the plunger, 10, is thereby released and the spring, 11, acting upon the plunger, draws the wire, 13, through the cable, 12, and thus operates the release lever of the camera shutter. This action takes place almost instantly, but, as explained, does not occur until sufficient time has elapsed to insure the opening of the camera shutter at the instant of the brightest illumination of the object by the powder burning in the flash pan.

It will now be clear that the photographer needs only to draw down the plunger, 10, and secure it by means of a combustible thread, 9, and then attach the loop, 14, to the release lever of the camera. At his leisure he may fill the pan, 1, with flash powder and at any moment thereafter may ignite the powder (as by means of the sparking device) with assurance that the shutter of the camera will be operated at the proper instant. No judgment or special skill is required to determine the moment of the opening of the camera shutter, for that office is reliably and satisfactorily performed by the synchronizer.

I claim:—

1. A device of the character described comprising, in combination with an illuminant and a shutter-release mechanism of a camera, a normally restrained operating member connected to said mechanism and adapted when released to open the shutter, and means whereby the heat of the illuminant may release said member.

2. A device of the character described comprising, in combination with an illuminant and a shutter-release mechanism of a camera, a member for actuating said mechanism to open the shutter, an element normally holding said member in inoperative position, said element being destructible by the heat of the illuminant, whereby said member is released.

3. A device of the character described comprising, in combination with a shutter-release mechanism of a camera, and an illuminant, a tensioned operating member for said shutter release mechanism and normally adapted to open the shutter, and an element engaging said member and holding it in inoperative position, said element being destructible by the heat of the illuminant, whereby said member is allowed to assume its operative condition.

4. In a flash light device attachable to a powder pan, a shutter release mechanism attached to said device and having an operating member adapted to open the shutter and to be held in inoperative position by an element destructible by the heat of the powder when ignited.

5. A device of the character described comprising, in combination with a shutter release mechanism of a camera, an illuminating device in combination with means for causing an ignition of the illuminant, and a normally restrained member for actuating said operating mechanism to open the shutter, said member being adapted for liberation by the heat of the illuminant.

6. A device of the character described comprising, in combination with a camera shutter-release mechanism, a flash light powder pan, a self-acting member carried by said pan and adapted for actuation of said mechanism, and a mounting on said pan adapted to hold a combustible element against pressure imparted by said member, whereby the action of said member is prevented until the heat of the burning powder weakens said combustible element, substantially as described.

7. A device of the character described comprising, in combination with an illuminant and a shutter release mechanism of the camera, of a member adapted to actuate said mechanism to open the shutter, and a combustible element adapted to restrain the operation of said member until said illuminant reaches a point of working efficiency.

8. A device of the character described comprising, in combination with a powder pan and a camera shutter-release mechanism, a plunger barrel mounted on said pan and carrying a spring plunger connected to said mechanism, said pan being provided with a mounting adapted to hold a plunger-restraining combustible element.

9. A device of the class described comprising, in combination with a shutter-release mechanism of the camera, a powder pan, a spring-pressed plunger connected to said mechanism and extending into said pan, and a combustible element in said pan adapted to normally extend across the path of travel of said plunger, whereby said plunger is releasable to actuate said mechanism only upon rupture of said element.

10. A device of the character described comprising, in combination with an illuminant, an igniter therefor, an illuminant receptacle, and a shutter-release mechanism for a camera, of a plunger barrel extending into said receptacle, a spring-pressed plunger within said barrel and extending into said receptacle, a flexible connector extending between said plunger and said mechanism, an adjustable clamp on said camera and adapted for attachment to said connector, an adjustable clip adapted to secure the end of said connector to said mechanism, and a fusible element above the bottom of said receptacle and extending across the path of said plunger, whereby said plunger is releasable to actuate said mechanism only upon rupture of said element.

In testimony whereof, I have hereunto set my hand this first day of November, 1915.

CLARENCE A. ELLSWORTH.